United States Patent [19]

O'Banion et al.

[11] Patent Number: 4,827,819
[45] Date of Patent: May 9, 1989

[54] STORABLE RADIAL ARM SAW

[75] Inventors: Michael L. O'Banion; Frederick R. Bean, both of Westminster, Md.; Andrea Garuglieri, Monguzzo, Italy

[73] Assignee: Black & Decker Inc., Newark, Del.

[21] Appl. No.: 942,614

[22] Filed: Dec. 16, 1986

[51] Int. Cl.$^4$ ............................ B27B 5/20; B27C 9/00
[52] U.S. Cl. ...................... 83/471.3; 83/473; 83/574; 83/477.1; 83/701; 144/35 R; 144/285; 144/287
[58] Field of Search .................... 83/471.3, 574, 477.1, 83/473, 701; 144/286, 285, 35

[56] References Cited

U.S. PATENT DOCUMENTS

| | | | |
|---|---|---|---|
| 2,587,177 | 2/1952 | Larson | 144/286 |
| 3,184,190 | 5/1965 | Halfinger | 248/13 |
| 3,465,793 | 9/1969 | Zuk | 83/477.2 X |
| 3,586,079 | 6/1971 | Colins, Sr. et al. | 144/35 |
| 3,628,578 | 12/1971 | Berg . | |
| 4,351,209 | 9/1982 | Alford | 83/788 |
| 4,378,107 | 3/1983 | Wagster et al. | 269/95 |
| 4,523,504 | 6/1985 | Alessio | 83/471.3 |

FOREIGN PATENT DOCUMENTS 8301034 3/1983 World Int. Prop. O. ......... 83/486.1

Primary Examiner—Donald R. Schran
Attorney, Agent, or Firm—Edward D. Murphy; Harold Weinstein; Edward D. C. Bartlett

[57] ABSTRACT

A radial arm saw includes a saw assembly pivotally mounted to a support unit which, in turn, is mounted to a wall or other support structure. The saw assembly includes a column that is connectable at one end to a saw table frame or the support unit so as to be affixed in upright operative position during operation and disposed during non-operation in a lateral, storage position. A radial arm and saw unit are supported from the other end of the column. Preferably, the column is pivotal between a lateral stored position and an upright operative position. Also, the saw assembly is pivotal relative to the support unit between a vertical stored position and a horizontal operative position. A leg locking sleeve may be released to deploy the saw assembly from its stored position into its operative position. The support column may be detachable to shift the radial arm saw between operative and stored positions. The frame is pivotal about a horizontal axis between operative and stored positions, and legs may be provided for added stability. The compact-storage radial arm saw is extremely stable, permits accurate cutting, and in its stored position provides a substantial savings in floor or bench space compared to conventional radial arm saws and yet can be quickly and readily deployed to its operative position.

12 Claims, 7 Drawing Sheets

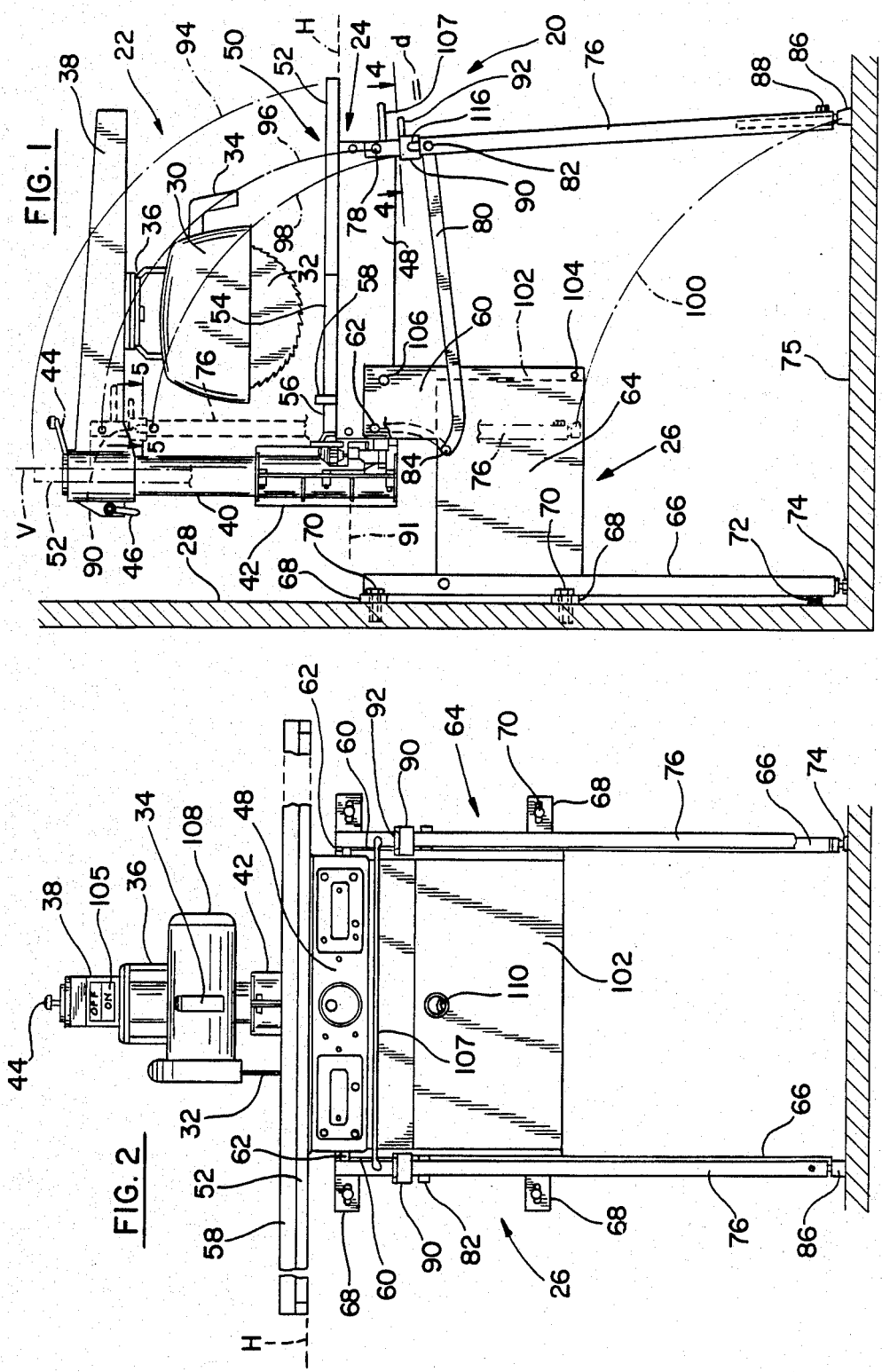

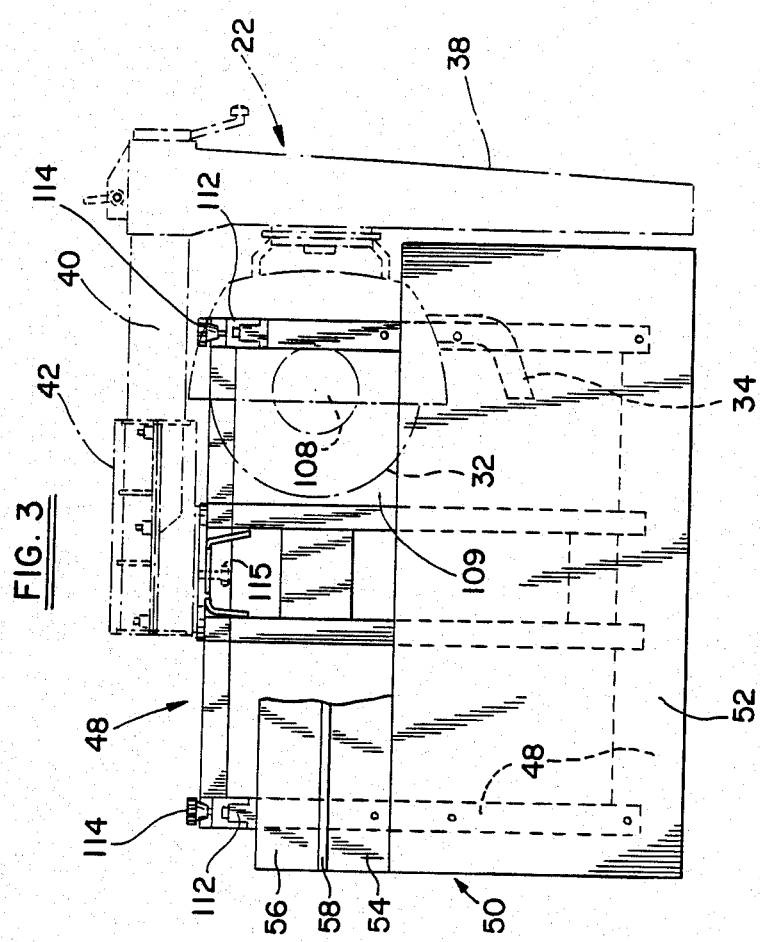
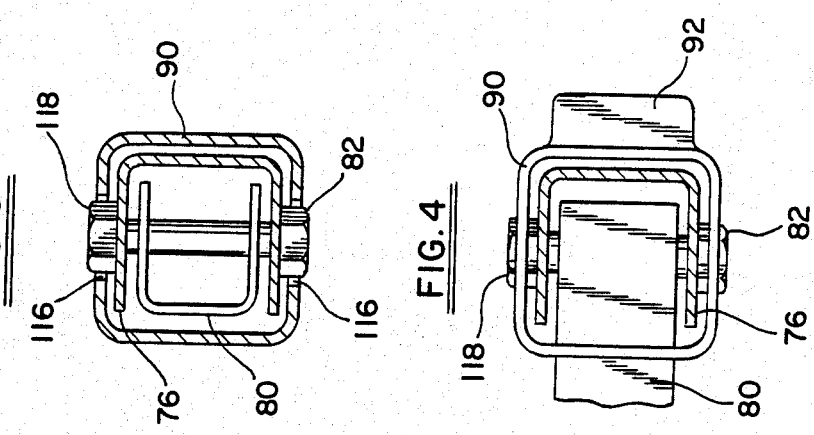

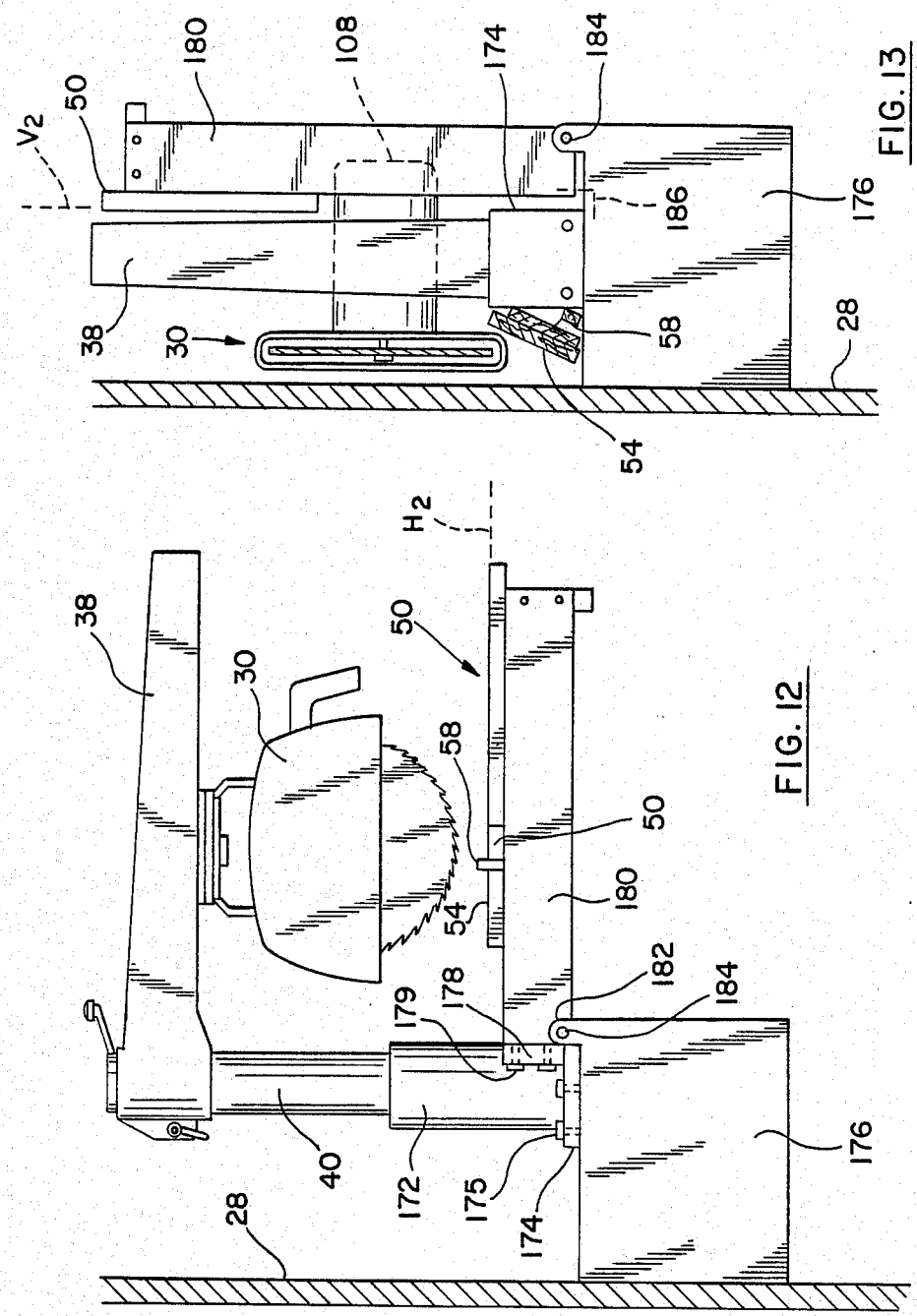

STORABLE RADIAL ARM SAW

FIELD OF THE INVENTION

The present invention relates to radial arm saws, and more particularly to the mounting and storage of radial arm saws.

BACKGROUND OF THE INVENTION

Radial arm saws have found widespread application in wood working shops, particularly in home shops, because of their flexibility, accuracy and ease of use. The typical radial arm saw includes a frame that carries an upright column upon which the radial arm is mounted. A saw unit is supported from a carriage suspended below the arm for movement by the operator. The radial arm saw can be bench-mounted, or floor-mounted with the aid of a stand. Saw assemblies of this type generally require considerable floor or bench area on either side during use. Accordingly, radial arm saws have generally not been considered portable or readily transportable from one work site to another, and are not well suited for use in workshops where space is limited.

A radial arm saw design is disclosed in U.S. Pat. No. 4,523,504 which is directed at portability and problems associated with ease of transportation. It provides a pivot-type connection between the base of the arm-supporting column and the saw frame to allow the column to be pivoted from its normally upright position to an inoperative lateral position. While the pivoted column arrangement does fulfill its intended purpose, the design does not deal with the question of workshop floor space, or convenient out-of-the way storage of the saw assembly and its subsequent quick deployment to an operational location. Also, because of its light weight and portability, a more skilled operator may be necessary to obtain a consistently high quality work product.

SUMMARY OF THE INVENTION

The present invention is concerned with the problem of creating a radial arm saw which can be folded into a compact space during periods of non-use and yet quickly deployed from a stored position to an operative position when required, can be permanently placed at one location if desired and yet assist in solving the floor space problem typically associated with conventional radial arm saws, particularly in home workshops where floor and bench space usually are limited.

It is, therefore, an object of the present invention, among others, to provide a radial arm saw that can be readily folded into a storage position in which the stored saw occupies substantially less floor space than a conventional radial arm saw.

It is another object of the present invention to provide a radial arm saw which occupies a minimum of floor or bench space when in its stored position and yet can be quickly and easily deployed to its operative position; which is easy to shift from the operative position to the stored position; and which is and remains wall mounted in both the operative position and the stored position.

It is still another object of the present invention to provide a radial arm saw which is accurate in operation and stable at all times; which solves the problem of bench or floor area space usually associated with radial arm saws, particularly in those workshops where space is limited; and which is easy to set up and easy to shift between operative position and stored position and vice versa.

In accordance with these objects, and others, the present invention provides a radial arm saw that includes a saw assembly pivotally connected to a support unit which, in turn, is secured to a wall or other vertical mounting surface, or to a support structure. The saw assembly includes a radial arm mounted at one end to a support column which, in turn, is mountable to a frame or other support in one or more positions.

In the preferred embodiment, the support column is pivoted between a normally upright vertical position relative to the frame and a lateral storage position. The frame and the support unit are pivotally connected together through a hinge assembly so that the frame, when the column is moved to its horizontal lateral storage position, can be moved from a horizontal operative position to an inoperative vertical stored position. A latch may be provided to lock the column to the frame in the operative position of the saw assembly wherein the column is vertical and the frame is horizontal.

In order to deploy the saw assembly from its stored inoperative position to its operative position, a leg clamp in the form of a sleeve may be released, thus freeing the frame to be pivotally moved to its horizontal position. The column is then pivoted from its horizontal lateral position to its vertical upright position and latched in place to provide a normally configured radial arm saw.

The support unit may advantageously include an interior space that can be used to store tools, spare blades, saw accessories and the like.

The present invention advantageously provides a fullfunction radial arm saw that can be conveniently and quickly moved from a fully operative position to a stored position in which latter position the saw occupies substantially less workshop space than a conventional radial arm saw while maintaining substantially all of the other operative advantages of the conventional radial arm saw.

A principal objective of the present invention is, therefore, the provision of an improved radial arm saw which can be shifted from an operative position to a stored position to save floor or bench space and which can be conveniently re-deployed to an operating position.

Other embodiments of the present invention are depicted wherein the column of the radial arm saw is mounted in a sleeve connected either to the support means or the saw table frame by permanent or detachable fasteners. Also, the frame is constructed to pivot from a horizontal operative position to a vertical non-operative position by being pivoted upwardly or downwardly, with or without legs and/or bracing.

Other objects, features, advantages and further scope of applicability of the present invention will become apparent from the detailed description to follow, taken in conjunction with the accompanying drawings, in which like parts are designated by like reference characters, and the appended claims.

BRIEF DESCRIPTION OF THE DRAWINGS

The invention is diagrammatically illustrated in the accompanying drawings in which:

FIG. 1 is a side elevational view of a radial arm saw of the present invention shown mounted to a wall, the solid line representation showing the operative position, and the broken line representation illustrating the stored position;

FIG. 2 is a front elevational view of the radial arm saw of FIG. 1;

FIG. 3 is a top plan view, with portions broken away to expose other parts, of the frame of the radial arm saw of FIG. 1 with the saw assembly shown in broken lines in a horizontal lateral collapsed position;

FIG. 4 is a sectional view taken along line 4—4 of FIG. 1 showing locking means in an unlatched position corresponding to the radial arm saw being in the operative position;

FIG. 5 is a sectional view taken along line 5—5 of FIG. 1 showing the locking means in latched position corresponding to the radial arm saw being in the stored position;

FIGS. 12 and 13 depict a third embodiment of the invention, FIG. 12 illustrating this radial arm saw in the operative position, and FIG. 13 showing the support column unconnected from and nested behind the raised frame upon the wall support with the radial arm saw in the stored position.

DETAILED DESCRIPTION OF THE PREFERRED EMBODIMENTS

Figure 6:
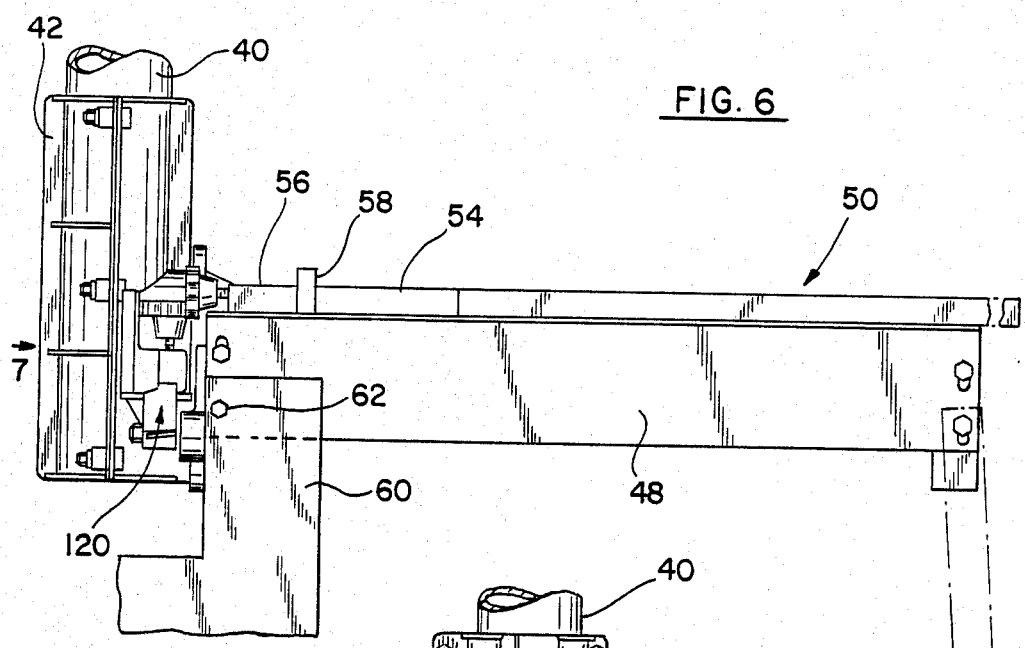
FIG. 6 is a side elevational view, with portions omitted, showing the frame in its horizontal position with the support column locked thereto in a vertical upright position corresponding to the operative position of the radial arm saw of FIG. 1.

The preferred embodiment of the invention is shown in and described with reference to FIGS. 1 to 8, and will be described first.

FIG. 1 diagrammatically illustrates a radial arm saw 20 according to the present invention and comprising a saw assembly 22, a saw table frame 24, and a wall support 26 securely mounted on a wall 28. The wall 28 may be a brick or block wall or a wooden framed wall of a workshop or other room in a building.

The saw assembly 22 comprises a saw unit 30 having a circular saw blade 32 and a handle 34. The saw unit 30 is suspended by a carriage 36 from a radial arm 38 and along which the saw unit 30 is translatable by grasping and moving the handle 34. The radial arm 38 is mounted on and cantilevered from the upper end of an upright, vertical column 40 the lower end of which is clamped in a socket 42. The radial arm 38 can be moved up and down the column 40 by means of a handle 44 for adjusting the height of the saw blade 32. The radial arm 38 can be pivoted about the column 40 in horizontal planes and locked in any selected position by a lever 46.

The frame 20 comprises a frame structure 48 having mounted thereon a horizontal work table 50 comprising a front fixed section 52, removable middle and rear sections 54, 56, with an upstanding fence 58 removably disposed between the sections 54, 56. The sections 54, 56 and the fence 58 are forwardly clamped against the rear edge of the fixed front section 52. The frame structure 48 is pivotally mounted between upstanding side plate extensions 60 of the wall support 26 on bolts 62, one on each side.

The wall support 26 has a hollow box portion 64 from which the extensions 60 extend upwardly from adjacent the front thereof. The rear of the box portion 64 has a vertical leg 66 securely attached to each side thereof. Each leg 66 has a pair of brackets 68, one at the top and the other partway along its length, which are securely fixed to the wall 28 by screws 70. At the lower end of each leg 66 is provided a plumb adjuster 72 and a height adjuster 74 which are adjusted to compensate for any variations in the wall 28 and the floor 75 so that the lower end of each leg 66 firmly engages both the wall 28 and the floor 75. It should be noted that the brackets 68 and the adjuster 72 space the leg 66 a short distance from the surface of the wall 28; this also helps in accommodating any variations in the surface of the wall 28.

A pair of foldway legs 76, one on each side, are pivotally connected at their upper ends by pivot bolts 78 to opposite sides of the frame structure 48 adjacent the front thereof. A bracing strut 80 is pivotally connected at one end, its forward end, to an upper portion of each leg 76 by a pivot bolt 82. Both the strut 40 and the leg 76 are of U-shaped channel section, and the forward end of the strut 80 is located inside the leg 76. The rear end of each bracing strut 80 is pivotally attached to the wall support 26 by a pivot bolt 84 located adjacent the top of the box portion 64 just rearwardly of the upstanding side plate extension 60. As can be seen, the rear end of the strut is curved upwardly, and the remainder of the strut 80 extends forwardly and upwardly at a small angle to the horizontal. The bottom of each leg 76 is provided with an adjustable foot 86 which telescopically extends upwardly inside the leg 76 (as shown in broken lines) and is secured in the adjusted position by a locking bolt 88. A locking sleeve 90 of rectangular tubular cross section is a loose sliding fit on the upper portion of each leg 76, and is located between the pivot bolts 78 and 82 which may act as stops to limit the sliding travel of the sleeve 90. As can be seen in FIG. 1, the lower edge of the sleeve 90 rests on the extended strut 80 and is thereby spaced a short distance d above and from the pivot bolt 82. At its upper forward edge the sleeve 90 is provided with a forwardly extending tab handle 92.

From the operative position shown in FIG. 1, the radial arm saw 20 can be folded away into a stored position adjacent the wall 28. First, the column socket 42 is unlatched and pivoted about a horizontal axis 91 until the column 40 lies along the back edge of the table 50, the radial arm 38 lies along the far side of the table 50, and the saw unit 30 extends downwardly partway through the table 50 to the position shown in FIG. 3 and as will be described more fully later. Secondly, the front of the table part 52 is then grasped in one or both hands and raised upwards and backwards to pivot the frame structure 48 upwardly about the pivot bolt 62. The table part 52 is so pivoted until it reaches the broken line position shown in FIG. 1 with its lower surface now in the vertical plane V. During this pivoting of the table 50 and frame structure 48, each leg 76 pivots about its pivot bolt 78 and hangs therefrom vertically, the strut 80 pivoting upwardly about its pivot 84 and also pivoting relative to the leg 76 about the pivot bolt 82. The final vertical position of the leg 76 is shown in broken lines in FIG. 1, and as can be appreciated, in this stored position the strut 80 becomes nested inside the leg 76. As the leg 76 reaches its stored position and the strut 80 folds inside the leg, the locking sleeve 90 is free to slide down the leg 76 until arrested by the pivot bolt 82. In this position, the locking sleeve 90 prevents downward return pivoting of the table 50, as will be described in more detail later, and so locks the radial arm saw in the stored position. During the folding (and subsequent unfolding) of the table 52 from the extended position shown in FIG. 1 full lines to the stored position shown in broken lines, the arcs along which various parts move are shown in broken lines. The front edge of the table 50 moves along a circular arc 94 centered on the axis of pivot bolt 62. The pivot 78 at the top of the leg 76 moves along a circular arc 96 also centered upon the axis of pivot bolt 62. The pivot bolt 82, connecting the strut 80 and the leg 76, moves along a circular arc 98 centered upon the axis of pivot bolt 84 at the rear end of the strut 80. The adjusting foot 86 at the bottom of the leg 76 moves along an arc 100 so that in the stored position the adjustable foot 86 is located outside and just above the bottom of the box portion 64 of the wall support 26 as shown in broken lines. Thus, it will be appreciated, that in the stored position, the leg 76, the frame structure 48, the table 50, and the saw assembly 22 are all positioned above the bottom of the box portion 64 and also are all positioned rearwardly of the front face of the box portion 64.

The box portion 64 is hollow and is bounded by side plates, a top, a bottom, and a back. The front of the hollow box portion 64 is closed by a door 102 (shown in broken lines in FIG. 1) which is pivoted at its lower edge to the side plates of box portion 64 by pivot hinges 104. When the radial arm saw is in the stored position, the door 102 is readily accessible and can be pivoted downwardly and forwardly to store in or remove from the inside of the box portion 64 accessories, tools etc. usable in association with the radial arm saw.

In the operative position of the radial arm saw shown in FIG. 1, the frame structure 48 is securely supported by the wall support 26 at the rear and the pair of legs 76 at the front with the bracing struts 80 therebetween. However, if desired, means may be provided to lock or latch the frame structure 48 in its operative, extended position. For example, a locking bolt 106 can be inserted through each side plate extension 60 into the frame structure 48, such bolt 106 being manually removed before pivoting the frame structure 48 to the stored position. Alternatively, a releasable latch may be provided between each side plate extension 60 and the associated side of the frame structure 48.

At a location between the pivot bolts 78 and 82, and just above the sleeve 90, the pair of legs 76 are rigidly secured together by a handle bar 107 which extends forwardly from each leg 76 just above the tab handle 92 on each sleeve 90. The purpose of the handle bar 107 is to facilitate unfolding the table 50 and frame structure 48 from the stored position to the operative position. To perform this unfolding operation, the handle bar 107 is grasped on each side by each hand, a finger of each hand used to engage the tab handle 92 of each sleeve 90 and raise that sleeve to unlock each leg 76 from its associated strut 80, and then the table unit pivoted downwardly using the handle bar 107. Once this downward pivoting has commenced, the fingers can release each tab handle 92 as each strut 80 becomes separated from inside the associated leg 76. In a desirable modification of the locking sleeve arrangement, the head and nut of the pivot bolt 82 may be recessed in the sides of the leg 76 and/or otherwise shaped and dimensioned so that the sleeve 90 passes over the pivot bolt 82 in the folded-away position of the saw table, each sleeve 90 then in such position sliding all the way down the leg 76 until it is stopped by the curved portion of the strut 80 extending rearwardly out of the leg 76. With this modification, to unfold the saw table the sleeves 90 are first slid upwardly to a position above the pivot bolts 82 and held in this raised position by a finger of each hand while the ends of the bar handle 107 are then grasped to lower the saw table.

It should be noted that the pivot bolt 84 is disposed rearwardly of the frame structure pivot bolt 62 so that the pivot bolt 84 will not interfere with the vertical stored position of the leg 76; and the rear end of the strut 80 is curved to accommodate this.

FIG. 2 is a diagrammatic front elevational view of the radial arm saw and shows the electric motor 108 of the saw unit extending to the opposite side of the radial arm 38 to the saw blade 32. The two parallel legs 76 can be seen connected together by the handle bar 107. The lower portion of the right hand front leg 76 has been broken away to show the bottom of the right hand rear leg 66 of the wall support 26. The four brackets 68 can be seen extending sideways outside the legs 76 and 66. The upstanding side plate extensions 60 can be seen spaced outwardly from the frame structure 48 with the two pivot bolts 62 bridging the gaps therebetween. The downwardly pivoting door 102 of the box portion 64 is provided with a handle 110 which can also be used to lock the door in the closed position. An on/off switch 105 for the motor 108 is located in the front face of the radial arm 38.

FIG. 3 is a diagrammatic top plan view of the saw table, with parts omitted and a portion broken away to show more details of the frame structure 48. The front portion 52 of the table is screwed to the frame structure 48. The middle portion 54, the fence 58, and the rear portion 56 of the table top are clamped by clamps 112 against the rear edge of the fixed portion 52. The clamps 112 may be tightened and loosened by rotating handles 114. By loosening the handles 114, the back portion of the table top comprising the parts 54, 58 and 56 can be removed. After removal of the parts 54, 58 and 56, the saw assembly 22 can be pivoted to the inoperative position shown in broken lines. To reach this position, the column 40 and socket 42 pivot about the horizontal pivot bolt 115 (shown in broken lines) until the column 40 and the radial arm 38 lie outside the saw table in substantially the plane thereof. During the final portion of this pivoting, the motor 108 enters and is partly housed in a cavity 109 between members of the frame structure 48, this cavity 109 being exposed when the table parts 54, 58, 56 are removed. After the saw unit 22 has been pivoted to the inoperative position shown in FIG. 3, the saw table and frame structure 48 are then ready to be pivoted upwardly and backwardly to the stored position indicated in broken lines in FIG. 1. I It will thus be appreciated that in the stored position, the saw assembly, particularly the saw blade 32, is positioned between the wall 28 and the now upright saw table 50 and frame structure 48, so shielding the saw assembly and the saw blade from access and accidental interference. Also, the on/off switch 105 of the saw will be adjacent the top of the stored radial arm so pointing upwards towards the ceiling; in this position the on/off switch is most inaccessible.

FIG. 4 diagrammatically shows a section on the line 4—4 in FIG. 1 with the sleeve 90 resting on top of the bracing strut 80. The U-shaped channel form of the leg 76 inside the sleeve 90 is clearly shown as is the tab handle 92 extending from the front of the sleeve 90.

FIG. 5 is a diagrammatic section on the line 5—5 in FIG. 1 and shows the U-shaped channel sectioned bracing strut 80 nested inside the leg 76. In this position the sleeve 90 has dropped down over the upper end of the nested strut 80 so preventing the strut 80 from pivoting relative to the sleeve 90 or the leg 76. To render this locking position of the sleeve 90 more effective, a cutout 116 is provided in the lower portion of each side of the sleeve to accommodate the head of the pivot bolt 82 and its nut 118 and allow the sleeve 90 to slide partially past the pivot bolt 82. Each cutout 116 extends approximately halfway up the height of the sleeve 90, as shown in FIG. 1.

Figure 7:
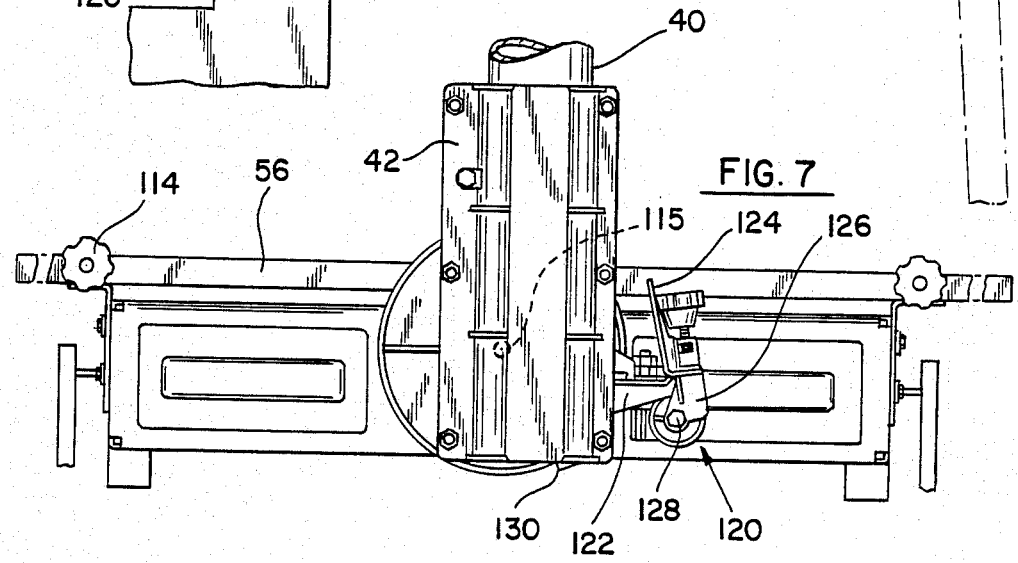
FIG. 7 is a rear elevational view, with portions omitted, taken in the direction of arrow 7 in FIG. 6, showing the frame with the support column locked thereto in the vertical upright position corresponding to the operative position of the radial arm saw.
Figure 8:
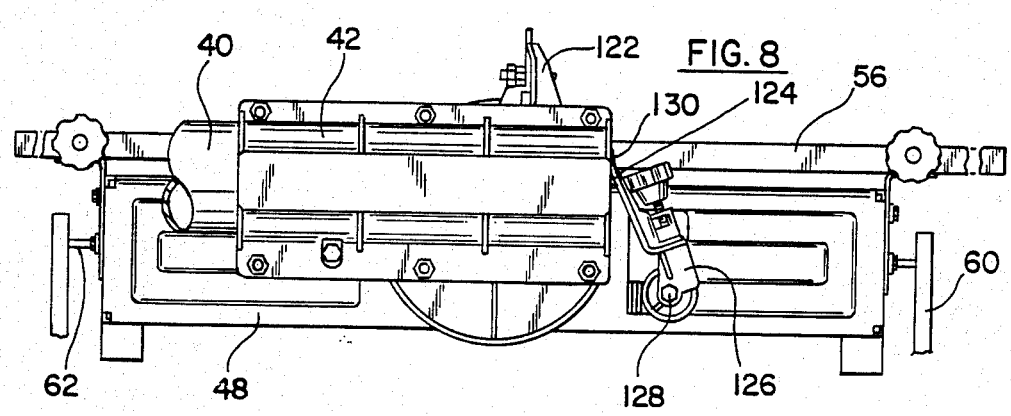
FIG. 8 is a rear elevational view similar to FIG. 7, but showing the frame with the support column unlocked therefrom and in the horizontal collapsed position corresponding to the broken line position in FIG. 3.
Figure 9:
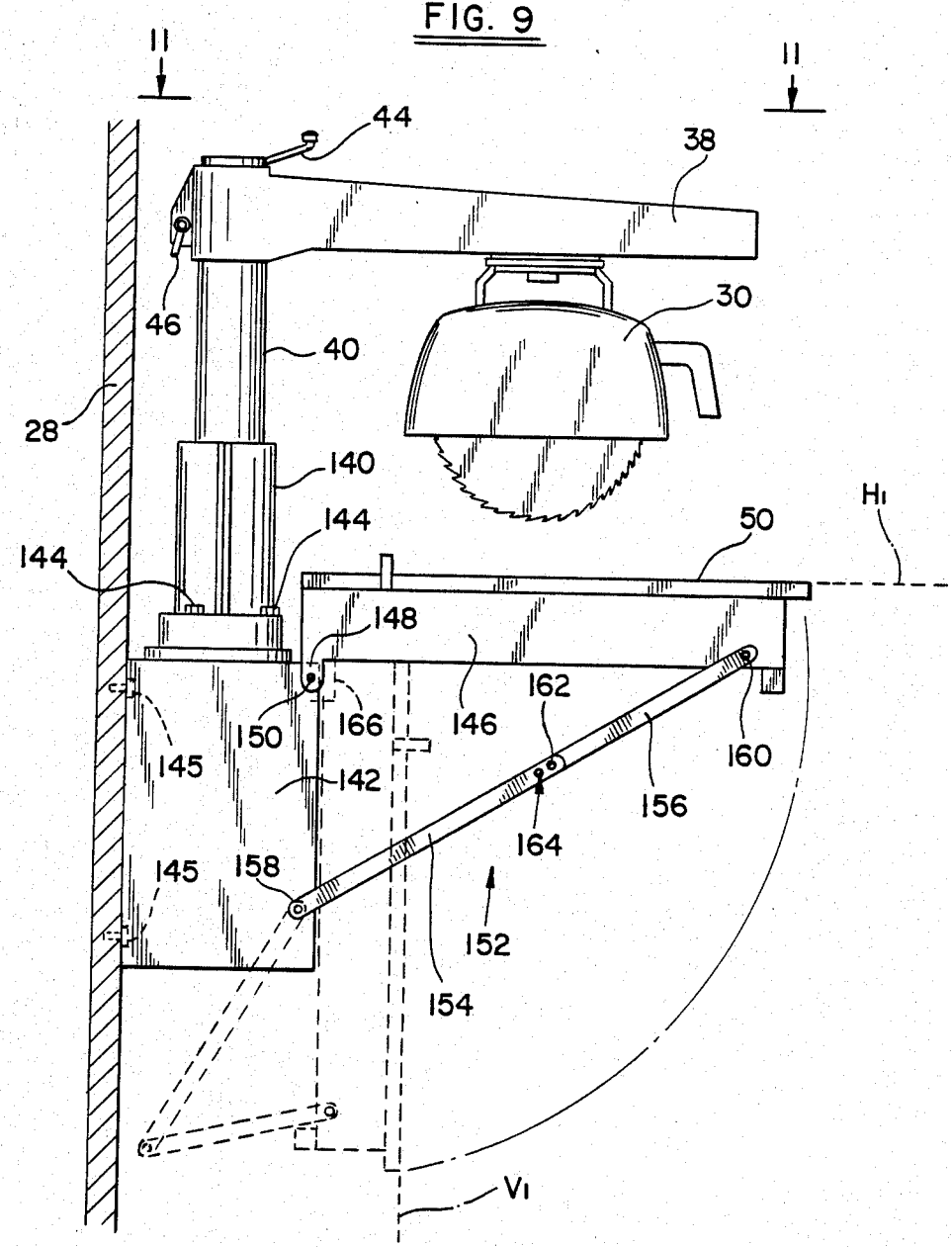
FIGS. 9 and 10 illustrate a second embodiment of the invention, FIG. 9 showing a radial arm saw in the operative position and FIG. 10 showing the radial arm saw in the stored position.
Figure 10:
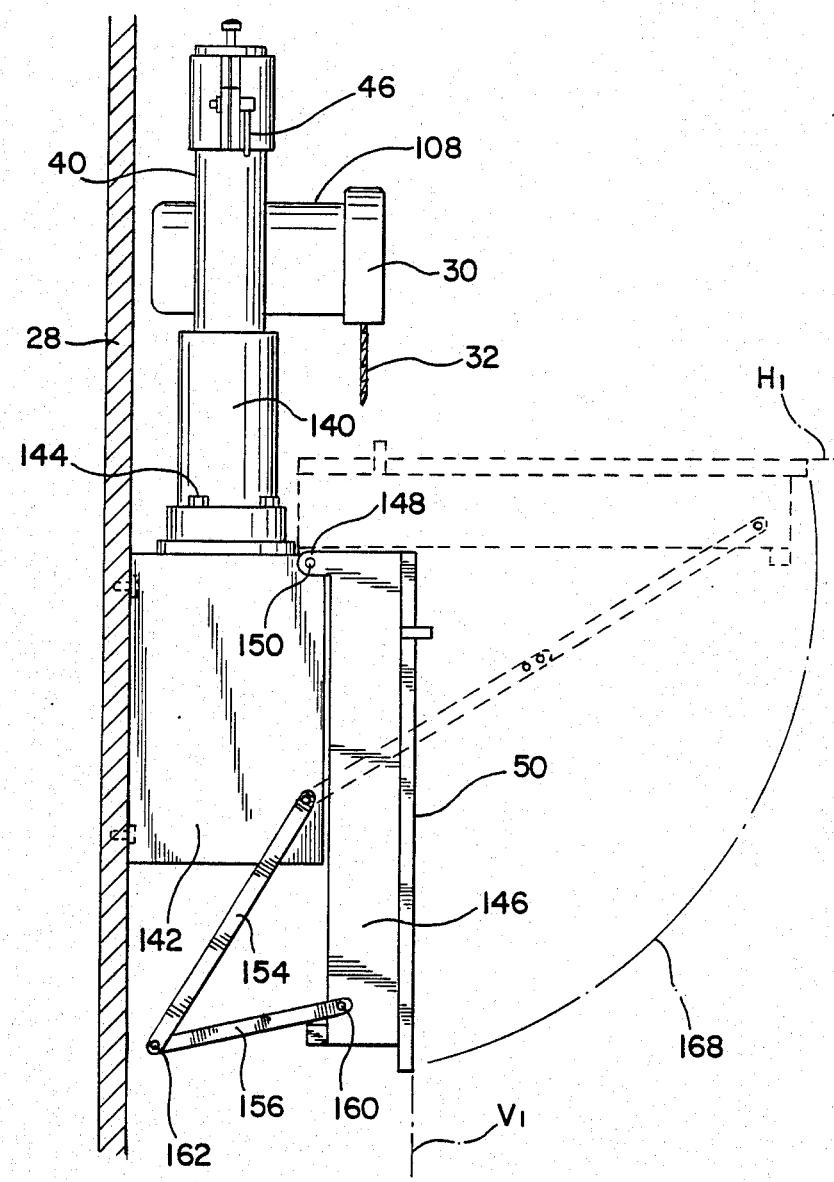
Figure 11:
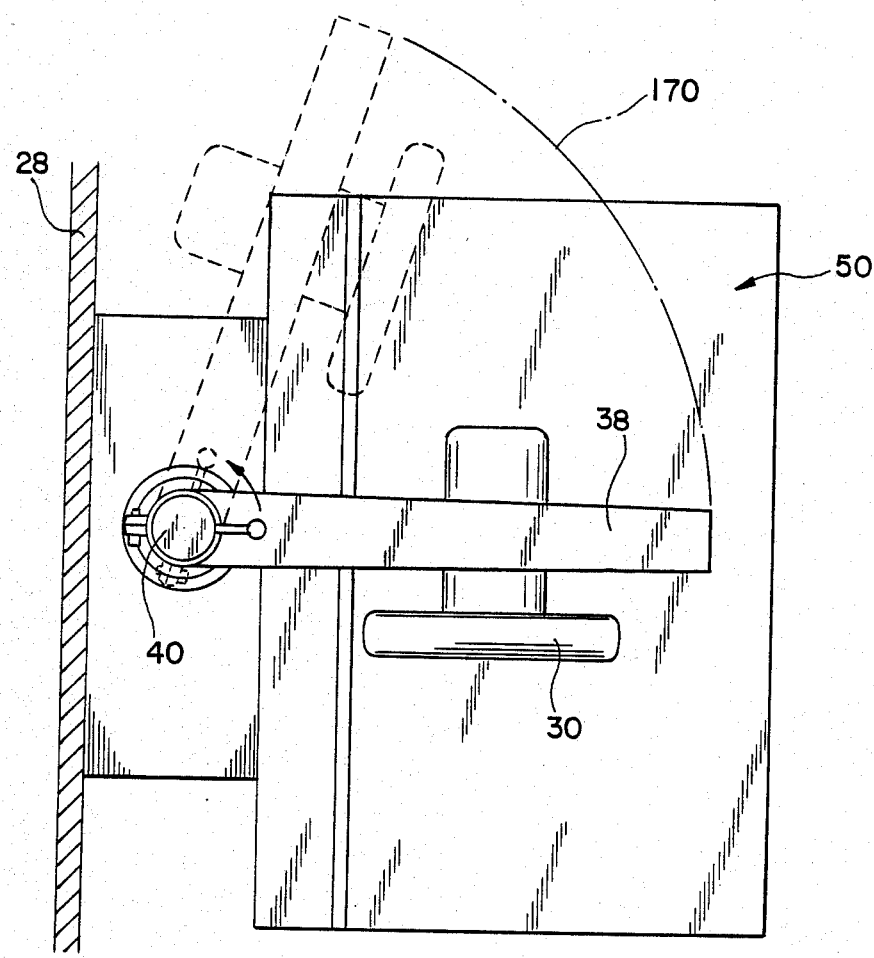
FIG. 11 is a top plan view taken on the line 11—11 in FIG. 9 showing the radial arm saw in operative position in full lines and displaced towards the stored position in broken lines.

FIGS. 6, 7 and 8 illustrate a latch mechanism 120 for locking the column 40 in the upright, vertical operative position (FIGS. 6 and 7), and also for locking the column 40 in the horizontal inoperative position (FIG. 8). An arm 122 extends at right angles to the socket 42 from one side thereof below the pivot 115 (FIG. 7) about which the socket 42 is pivotal. In the upright vertical position of the column 40, an arm assembly 126 carrying an L-shaped bracket 124 is resiliently biased about a pivot 128 to cause the base of the L-shaped bracket 124 to engage over the free end of the arm 122 and latch the socket 42 in its vertical position—as shown in FIG. 7. To pivot the column 40 to the inoperative position, the L-shaped bracket 124 is manually pivoted clockwise in FIG. 7 to unlatch the arm 122, so allowing the socket 42 to be pivoted counter-clockwise to its inoperative, stored horizontal position. When the L-shaped bracket 124 is released, its upper end is resiliently biased counter-clockwise to engage the base of the socket 42 and also engage under a ramp-like detent 130 extending from the base of the socket 42 to latch the socket 42 and column 40 in the horizontal collapsed position. To again erect the column 40 to its vertical position, the bracket 124 is manually moved clockwise against the spring bias to disengage the bracket 124 from the detent 130 so allowing the column 40 to be pivoted clockwise. This column latching arrangement 120 is more fully disclosed in U.S. Pat. No. 4,523,504 in which it is illustrated in FIGS. 9, 10 and 11 thereof. Also, the manner of pivoting the saw assembly into and around the frame structure of a radial arm saw to collapse such for storage is more fully described and illustrated in U.S. Pat. No. 4,523,504 the whole disclosure of which is hereby incorporated herein by reference.

FIGS. 9, 10 and 11 illustrate a second embodiment of the present invention. In this embodiment the saw table 50, the saw unit 30, the radial arm 38, and the column 40 are the same as previously described with respect to the previous embodiment. However, the base of the column socket 140 is provided with a flange which is mounted on the top of a box-like wall support 142 and secured thereto by four bolts 144 (only two of which can be seen). The box-like wall support 142 is hollow to form a storage compartment and has a downwardly pivoting front door similar to that previously described in relation to FIGS. 1 and 2. The box-like support 142 is mounted on and secured to the wall 28 by four screws 145 (two of which are shown in broken lines) which are driven home into the wall 28 from inside the support 142. The saw table 50 is supported on a frame structure 146 which is provided at its rear lower edge with a pair of downwardly extending lugs 148 each of which is pivotally mounted on a side of the wall support 142 by a pivot bolt 150. A bracing strut 152 comprising two part-struts 154 and 156 is pivotally attached at its lower end to the wall support 142 by a pivot 158, spaced below the pivot 150, and at its upper end the strut 152 is pivoted to the side of the frame structure 146 adjacent the front thereof by a pivot bolt 160. The two strut parts 154, 156 are pivoted together at 162. A releasable latch means may be provided to prevent the strut parts 154 and 156 pivoting relative to each other when in the supporting position of FIG. 9; this releasable latch means is schematically shown and identified by the reference numeral 164. Alternatively, or in addition, one of the strut parts 154, 156 could be provided with a flange at one edge and abutting the other strut part to prevent the bracing strut 152 folding and moving the pivot 162 upward under the weight of the saw table 50 and the frame structure 146. A releasable latch may be provided between the wall support 142 and the frame structure 146 to releasably lock the frame structure 146 in the extended, horizontal operative position shown in FIG. 9; such a releasable latch is schematically illustrated by the broken line 166.

FIG. 10 illustrates the stored position of the radial arm saw; this position has been obtained from FIG. 9 by releasing the lever 46, pivoting the radial arm 38 on the column 40 until parallel to the wall 28, locking the radial arm 38 in this position with the lever 46, and then releasing the latch 164 with movement of the pivot 162 downwards to enable the saw table 50 and frame structure 146 to be pivoted downwardly about the pivot 150 to extend downwardly in a vertical position in front of the wall support 142. The storage position of the saw table 50 and frame structure 146 is shown in solid lines in FIG. 10 and broken lines in FIG. 9. The extended operative position of the saw table and frame structure is shown in solid lines in FIG. 9 and broken lines in FIG. 10. The front edge of the saw table 50 moves through a circular arc 168 about the axis of the pivot 150 when moving between the operative and stored positions. As will be appreciated, the surface of the saw table 50 lies in a horizontal plane $H_1$ in the extended operative position, and in a vertical plane $V_1$ in the stored position. It will also be appreciated that there is a pivot 150 on each side of the wall support 142, and also a pair of bracing struts 152 one on each side of the frame structure.

FIG. 11 is a top plan view of this second embodiment viewed along the line 11—11 in FIG. 9. In broken lines the radial arm 38 and saw unit 30 are shown swung counter-clockwise about the vertical column 40 to nearly the stored position shown in FIG. 10. During swinging movement of the saw unit 30 to and from the stored position of FIG. 10, the radially outer end of the radial arm 38 moves along an arc 170 centered on the vertical axis of the column 40.

A third embodiment of the present invention is illustrated in FIGS. 12 and 13. FIG. 12 shows the radial arm saw in the operative position with the saw table 50 extended. FIG. 13 shows the radial arm saw in the stored position with the saw table 50 folded upwardly to a vertical position and the column 40, radial arm 38, and saw unit 30 stored between the saw table 50 and the wall 28. In this embodiment, the wall support 176 is similar to that in the previous embodiment except it has a pair of upstanding lugs 182 at the top front edge. Each lug 182 supports a pivot 184 on which the frame structure 180 of the saw table is pivotally mounted. The socket 172 of the column 40 is provided with a base flange 174 and a front flange 178. The base flange 174 is mounted on the top of the box-like wall support 176 and releasably secured thereto by four machine screws 175. The forward flange 178 is releasably secured to the rear edge of the frame structure 180 by machine screws 179. Thus, in the operative position shown in FIG. 12, the saw table 50 and its frame structure 180 are cantilevered forwardly from the wall support 176 and immoveably secured in this position to the wall support via the flanges 178 and 174 of the socket 172. In this operative position the top of the saw table 50 lies in a horizontal plane $H_2$. To move the radial arm saw into the stored position shown in FIG. 13, the machine screws 175 and 179 are removed; then the saw unit and column 40 lifted up and stored on the wall support 176 with the socket 172 and column 40 lying along the top of the wall support 176, and with the saw blade guard of the saw unit 30 being positioned adjacent the wall 128. The removable rear portions of the saw table 50 are now removed, i.e. the parts 54, 56, and 58, and placed on top of the wall support 176 in the space between the column and radial arm unit 40, 38 and the wall 28, as illustrated in FIG. 13. The saw table 50 and frame structure 180 are then pivoted upwardly about the pivot 184 until the surface of the saw table 50 lies in a vertical plane $V_2$. During this upward pivoting of the saw table 50, the end of the motor 108 extending away from the wall 28 enters into and is stored in a recess in the frame structure 180 exposed by removal of the rear portion of the saw table 50 (similarly as described with references to FIG. 3). When the frame structure 180 has reached the vertical position shown in FIG. 13, it is latched in position by latch means operative between the wall support 176 and the frame structure 180 as indicated schematically by the broken line 186.

In the embodiment of FIG. 1 to 8, the removable rear parts 54, 56 and 58 of the saw table 50 can, in the stored position of the radial arm saw, also be stored on top of the wall support between the wall 28 and the column 40 in a similar manner to that shown in FIG. 13.

The above described embodiments, of course, are not to be construed as limiting the breadth of the present invention. Modifications, and other alternative constructions, will be apparent which are within the spirit and scope of the invention as defined in the appended claims.

What is claimed is:

1. A radial arm saw for mounting to a wall or other support structure, comprising:
   (a) a saw assembly having a frame, a column, a radial arm connected to one end of the column, and a saw unit carried by the radial arm for movement throughout a range of sawing operations;
   (b) associating means for associating the column with the frame and for positioning the column relative to the frame between an operative position and a non-operative position;
   (c) support means for mounting on the wall or other support structure and for supporting said saw assembly;
   (d) means for connecting said saw assembly to the support means for movement of the saw assembly relative to the support means between an extended position and a stored position;
   (e) said connecting means comprising at least a pair of hinges;
   (f) bracing means, connected between the support means and the frame of the saw assembly, for selectively holding said frame of the saw assembly in the extended position or the stored position;
   (g) a plurality of legs pivotally connected to the saw assembly and having end portions of said bracing means pivotally connected thereto;
   (h) said plurality of legs comprising a pair of front legs pivotally shiftable between a supporting position with the legs lowered into contact with the ground, and a stored position with the legs raised upwardly out of contact with the ground; and
   (i) locking means, mounted on the legs, for locking the radial arm saw in the stored position and, upon release of the locking means, for permitting shifting of the legs into said supporting position and said frame into said extended position.

2. The radial arm saw claimed in claim 1, wherein:
   (a) the frame of the saw assembly is movable from a horizontal plane in the extended position to a vertical plane in the stored position.

3. The radial arm saw claimed in claim 1, wherein:
   (a) other end portions of said bracing means are pivotally connected to said support means;
   (b) said legs and said bracing means are disposed substantially non-parallel to each other in said operative position, and in said stored position said legs and said bracing means are disposed substantially parallel to each other;
   (c) said locking means includes sleeve members carried by said legs; and
   (d) the sleeve members engage the legs and the bracing means in locked contact therewith when the legs and the bracing means are in their parallel disposition, and the sleeve members remain in unlocked contact therewith when the legs and the bracing means are in their non-parallel disposition.

4. The radial arm saw claimed in claim 3, wherein:
   (a) a tab member is formed externally of each sleeve member for lifting the sleeve members from the locked contact for permitting lowering of the legs from the stored position for placing the radial arm saw in the operative position.

5. The radial arm saw claimed in claim 4, wherein:
   (a) said support means includes an interior storage space.

6. The radial arm saw claimed in claim 5, wherein:
   (a) said support means further comprises an access door movable between open and closed positions for providing access into said storage space.

7. The radial arm saw claimed in claim 3, comprising pivotal connecting means for releasably locking the column relative to said frame, the pivotal connecting means comprising:
   (a) a socket connected to the support means;
   (b) the socket having clamped therein a lower end of the column; and
   (c) latching means for latching the socket in both the operative position and the stored position.

8. A radial arm saw, comprising:
   a saw table mounted on a frame structure;

a column unit pivotally mounted to a rear portion of the frame structure and pivotal relative to the saw table between vertical and horizontal orientations;

latch means, connected between the column unit and the frame structure, for releasably latching the column unit in the vertical orientation when the saw table is disposed in a horizontal position, and for releasably latching the column unit in the horizontal orientation when the column unit is pivoted thereto;

a radial arm mounted on and extending from said column unit and carrying a saw unit;

support means, on which said rear portion of the frame structure is pivotally mounted, for supporting said frame structure;

front legs pivotally connected to a front portion of said frame structure to support said front portion when said saw table is in its horizontal position;

bracing struts pivotally connected at opposite ends to said support means and said legs and holding said legs in supporting disposition when said saw table is in its horizontal position; and locking means for releasably locking said bracing struts to said legs when said saw table is pivoted with said frame structure about said support means to a vertical position to retain said saw table in said vertical position.

9. The radial arm saw of claim 8, wherein said support means comprises:

a box-like structure having an internal storage space for tools and saw accessories; and rear legs attached to a rear of said box-like structure.

10. The radial arm saw of claim 9, further comprising:

means for securing said support means to a wall; and adjustable means, mounted on said rear legs, for bearing against the wall to which said support means is secured and for adjustably spacing said rear legs from said wall.

11. The radial arm saw of claim 8, wherein said locking means comprises:

a sleeve slidably mounted on at least one of said front legs, said sleeve being disposed between said frame structure and one of said bracing struts in the horizontal position of said saw table;

a handle extending from said sleeve; and a handle bar secured at opposite ends to said front legs and extending therebetween; and wherein said bracing struts nest within said front legs when said saw table is in said vertical position.

12. The radial arm saw of claim 8, wherein:

said saw table has a removable rear section covering a cavity in said frame structure into which cavity a portion of said saw unit enters and is housed when said column unit is pivoted to said horizontal orientation with said saw table in said horizontal position and said saw table rear section removed;

said support means comprises a box-like structure having an interior compartment accessible via a door pivoted to a front of said box-like structure;

said bracing struts are each curved at a rear end and pivotally connected to said support means rearwardly of and below a location at which said rear portion of said frame structure is pivotally mounted on said support means;

said bracing struts are pivotally connected to said front legs adjacent but below said front portion of said frame structure;

said front legs are connected together by a handle bar extending therebetween adjacent said frame structure;

said locking means comprises a sleeve slidably mounted on each front leg at a location between said handle bar and the respective bracing strut in said horizontal position of said saw table; and said bracing struts nest in said front legs when said saw table is in said vertical position, said radial arm saw then being in a stored position with said saw unit partially housed in said cavity and stored between said frame structure and said wall above said box-like structure.

* * * * *